(12) United States Patent
Jensen et al.

(10) Patent No.: US 7,754,070 B2
(45) Date of Patent: *Jul. 13, 2010

(54) HIGH EFFICIENCY ION EXCHANGE SYSTEM FOR REMOVING NITRATE CONTAMINANTS FROM WATER

(75) Inventors: Peter L. Jensen, San Diego, CA (US); Gerald A. Guter, San Clemente, CA (US); Dan Ziol, Pasadena, CA (US)

(73) Assignee: Envirogen Technologies, Inc., Kingwood, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/931,943

(22) Filed: Oct. 31, 2007

(65) Prior Publication Data

US 2008/0116123 A1 May 22, 2008

Related U.S. Application Data

(62) Division of application No. 11/409,384, filed on Apr. 20, 2006, now Pat. No. 7,361,281, which is a division of application No. 11/085,961, filed on Mar. 21, 2005, now Pat. No. 7,041,223, which is a division of application No. 10/001,185, filed on Oct. 25, 2001, now Pat. No. 6,878,286.

(60) Provisional application No. 60/243,647, filed on Oct. 25, 2000.

(51) Int. Cl.
*C02F 1/42* (2006.01)

(52) U.S. Cl. .................. 210/142; 210/269; 210/284; 210/418

(58) Field of Classification Search .................. 210/143, 210/269, 277, 278, 284, 340, 424, 142, 418
See application file for complete search history.

(56) References Cited

U.S. PATENT DOCUMENTS

| | | | |
|---|---|---|---|
| 3,366,241 A | 1/1968 | McMorris |
| 3,482,697 A | 12/1969 | Tremont et al. |
| 3,531,401 A | 9/1970 | Crits |
| 4,687,582 A | 8/1987 | Dixon |
| 5,026,482 A | 6/1991 | Sircar |
| 5,069,779 A | 12/1991 | Brown et al. |
| 5,182,023 A | 1/1993 | O'Connor et al. |
| 6,066,257 A | 5/2000 | Venkatesh et al. |
| 6,383,388 B1 | 5/2002 | Krauter et al. |
| 6,537,456 B2 | 3/2003 | Mukhopadhyay |
| 6,706,195 B2 | 3/2004 | Jensen et al. |
| 6,878,286 B2 | 4/2005 | Jensen et al. |

FOREIGN PATENT DOCUMENTS

| | | |
|---|---|---|
| CH | 671 759 | 12/1978 |
| WO | WO 90/06820 | 6/1990 |

*Primary Examiner*—Matthew O Savage
(74) *Attorney, Agent, or Firm*—Swiss Tanner, P.C.

(57) ABSTRACT

The disclosed invention is a fixed bed ion exchange water purification system. It employs a combination of electronically controlled process steps and specific systems configurations to duplicate the effects of moving resin beds from one operating position to another as is required in moving bed ion exchange water purification systems. The intention combines features of single fixed bed ion exchange systems with those of a moving bed system. The invention applies to the treatment of water having typical industrial and drinking water concentrations of various ions.

7 Claims, 10 Drawing Sheets

HIGH EFFICIENCY ION EXCHANGE SYSTEM FOR REMOVING NITRATE CONTAMINANTS FROM WATER

CROSS-REFERENCE TO RELATED PATENT APPLICATIONS

This application claims priority to and is a division of U.S. application Ser. No. 11/409,384 filed Apr. 20, 2006 incorporated herein by reference in its entirety; which application claims priority to and is a division of U.S. application Ser. No. 11/085,961, filed Mar. 21, 2005, and now issued on May 9, 2006 as U.S. Pat. No. 7,041,223 incorporated herein by reference in its entirety; which application claims priority to and is a division of U.S. application Ser. No. 10/001,185, filed Oct. 25, 2001, and now issued on Apr. 12, 2005 as U.S. Pat. No. 6,878,286 incorporated herein by reference in its entirety; which is an application claiming the benefit under 35 USC 119(e) U.S. Application Ser. No. 60/243,647, filed Oct. 25, 2000, incorporated herein by reference in its entirety.

FIELD OF THE INVENTION

This invention relates to ion exchange systems for removing contaminants from water. More particularly it relates to fixed bed ion exchange systems which are configured to yield the flexibility and efficiency of moving bed systems.

BACKGROUND AND STATE OF THE ART

Ion exchange is a chemical process often used to separate certain contaminant substances from a drinking water supply containing a mixture of several other harmless dissolved substances. For example, common ground water used for drinking water will contain substances such as the ionic forms of calcium, magnesium, sulfate, chloride and bicarbonate. In many cases, the water may also contain contaminants that are known to be detrimental to health. Such ionic substances as nitrite, nitrate, arsenic, antimony, fluoride, selenate, chromate, perchlorate and other similar harmful substances are often found. It is desirable to separate out the contaminants harmful to health by treating the water with an ion exchange system. It is also desirable to separate cations such as calcium and magnesium from this mixture if the water is to be used for industrial processes.

Ion exchange processing systems range in production capacity from 50 gallons per day (GPD), such as is used in home water softeners and water purification devices, to very large plants having a capacity of several million gallons per day (50 to 100 million GPD) for centralized treatment of a public water supply.

Various equipment configurations or systems of vessels, plumbing and valves are used to apply the ion exchange process to the above purpose of treating a water supply to remove undesirable substances. For example, one prior art system is shown in FIG. 1 as system 100. This system is referred to as a single "fixed bed" design. The water to be treated is pumped from line 10 through a vessel 12 containing a bed 14 of ion exchange resin. Purified water is removed via line 16. Note that the word "single" indicates that all process streams flow through the vessel 12 only once before continuing flow. Also the term "fixed bed" indicates that all ion exchange vessels are fixed in their positions.) During operation, there is no visible change in the positioning of the vessels or piping or any other component, only the internals of the valves change as they go from open to closed. (In contrast, when a moving bed system is in operation the position of the vessels and piping change and a multiport valve remains in a fixed position.

The vessel 12 containing the bed 14 is equipped with about eight to eleven different valves which control which process stream passes through the ion exchange bed. These are large full capacity valves capable of handling 50 to 100 percent of the peak flow-rate through the plant. Practical flows of 500 to 1000 gallons per minute or more capacity for valve passage are not uncommon. By selecting the proper set of valves to be opened or closed either manually or by electronic controls, the flow of water to be treated by being passed through the vessel 12 and resin bed 14 can be stopped when the resin bed is exhausted. Control valve operations allow a sequence of process steps to be executed involving rinsing, regenerating and back washing and declassification (if required) to restore the adsorptive capacity of the resin. This sequence of steps produces a quantity of waste water that contains waste salt materials. This quantity of waste water is discarded. In FIG. 1 regenerant solution, such as brine, is shown supplied via line 18 and removed via line 20 and rinse liquid is shown being supplied via line 22 and removed via line 24.

Use of a single fixed bed of the prior art is also similar to a batch operation in that the flow of treated water is stopped completely while the resin goes through the resin regeneration steps. If an uninterrupted flow of treated water is desired, at least two fixed bed units must be used in parallel. Each bed is operated as above. After the first bed is exhausted, the bed is taken off line and regenerated while the second bed is placed into operation.

In general, a fixed bed system is comprised of as few vessels as is economically possible from the cost equipment point of view. Keeping the number of vessels to a minimum also reduces the number of large valves to be maintained or replaced. It also simplifies the valve control system with fewer valves to operate. It is customary therefore for plant designers to minimize the number of vessels to keep the number of valves to a minimum.

There are disadvantages, however, because larger vessels and large valves are required. To maintain or replace vessels or valves on a twelve foot diameter vessel, two or three men are required with the aid of heavy equipment lifting devices. Operation and maintenance costs will rise when first equipment costs are low because of large vessels. A popular design of a fixed bed system uses three vessels. Twenty four to thirty three large valves must be operated and maintained on such a system.

With a fixed bed system it is also often required to declassify the resin bed after regeneration. This step requires time and process water and produces additional waste water. The present invention eliminates this step.

Another prior art ion exchange system is known as a moving bed system or as a "merry-go-round" design. In this system the ion exchange resin is contained in several small vessels containing only an inlet port and an outlet port. Multiport valves communicate with these ports and control which process stream flows through each vessel. FIG. 2 depicts such a system as 200. These systems eliminate the use of large vessels and the subsequent high maintenance and replacement costs. In these systems multiple vessels 12, such as eighteen vessels numbered 1 through 18 are mounted on a circular platform 26 near the perimeter of a platform that slowly rotates while the system is in operation. The vessels 12 are each coupled through a line 32 to an upper multiport valve 28 and through a line 34 to lower multiport valve 30. Valves 28 and 30 can be combined or separate as shown.

The multiport valves are constructed with fixed (in and out) ports corresponding in position to the (in and out) ports of the ion exchange vessels which rotate part. The types of process streams flowing through the various vessels is controlled by the multiport valves 26 and 28 and is dependant on the position of the vessel on the circular platform. Consequently, as the platform rotates, the process stream entering and leaving any of the vessels changes according to a predetermined and difficult to alter process flow, set by the multiport valves.

Returning to FIG. 2, the system 200 shown therein has eighteen discreet vessels 12 and eighteen discreet positions for a vessel on the circular, rotating platform 26. The rotation of the platform physically moves each vessel from one position to the next position with all eighteen vessels moving simultaneously. The multiport valves 26 and 28 are positioned in the center of the rotating platform. The main process streams of treated water, regenerant, and rinse are first fed to the central multiport valves that then select the appropriate process stream for each position into which a vessel can be placed.

For example, a single vessel physically moves from position to position as shown in FIG. 2 When a given vessel is in positions 4 through 18 on the merry-go-round, it is fed untreated water from line 10 through valve 26 and line 30 which it purifies and discharge via line 32, valve 28 and line 16. As the vessel moves from position 4 through to 18 it continues in water treatment service but at each successive step the resin becomes more and more loaded with contaminant until it is virtually exhausted in position 18. When the vessel is moved into positions 1 through 2, a brine stream enters the vessel via line 22, valve 28 and line 32 to regenerate the resin by displacing contaminant off of it. Spent regenerant is removed via line 34, valve 30 and line 24. When the vessel is moved into position 3, a rinse and/or backwash stream enters the vessel via line 18, valve 30 and line 34 to displace regenerant solution. Rinse is removed via line 32, valve 28 and line 20. After making a complete rotation around the merry-go-round the vessel again enters the adsorption section starting at position 4 and advances step by step again to repeat the cycle.

One result of this configuration is the elimination of the large single port valves which were required for the fixed bed design. Practical designs for the moving bed systems incorporate numerous small vessels as dictated by mechanical stability and weight distribution considerations. The most mechanically stable systems use several (ten to forty) small vessels mounted on the "merry-go-round" to obtain an evenly distributed mechanical load.

These conventional systems present the following disadvantages.

High Wastewater Production

Conventional ion exchange systems are usually designed to keep equipment costs and operator and maintenance costs to a minimum while producing a water suitable for consumption. The generation and disposal of wastewater produced by ion exchange systems is usually a less important consideration. Conventional systems will produce from two to ten percent of the plant production as wastewater. The present invention minimizes waste water production and minimizes those operating costs dealing with the production and disposal of waste water. In many cases, the disposal of waste is a major cost of operation and becomes most important when operation over several years is considered. The invention produces as little as ten to thirty percent of the waste produced by conventional designs.

High Valve Maintenance and Spatial Requirements

Another disadvantage of the fixed bed system is the large number of heavy and bulky automatic valves needed to control the process flows through each vessel and the use of large diameter vessels. The main disadvantage of the moving bed system is that it requires two to three times the space and also requires very large and complex specialized multi port valves and a complex plumbing design. The net result is a far more costly system—approximately three times the cost of its fixed bed counterpart.

Mechanical Instability and Cost

Another disadvantage of the moving bed system is its inherent mechanical instability. It presents a high center of gravity on top of a central mounting pivot. This design is subject to relatively small earthquake forces. Steel girder supports are often required to enhance stability, but cost increases.

Design Inflexibility

Disadvantages common to both systems of the art in comparison to the invention are that the process flow design for each conventional system must be fixed. at design time. Fixed mechanical elements will determine the process stream that enters and leaves each vessel. To alter the process design at run time, the valves built into the rotating platform or the multiport valve, which rotates in unison with the rotating platform, must be mechanically altered or completely, redesigned. Run time changes in a fixed bed system will also require physical changes to the system such as re-plumbing a portion or all of the vessels and valves.

The present invention allows flexibility in process design and equipment and optimum placement of vessels and piping to maximize process efficiency and minimize wastewater production. It permits any vessel to be out of service at any time. Other advantages are discussed below.

STATEMENT OF THE INVENTION

This invention provides a special water treatment system comprised of a combination of ion exchange vessels, valves, piping and plumbing, electronic controls and processing sensors. This system is more efficient to construct, maintain and operate than conventional systems. The invention combines features of fixed bed systems with those of moving bed systems.

The invention primarily applies to the treatment of water having typical drinking water components such as calcium, magnesium, sodium and chloride ions but also containing undesirable inorganic contaminants such as nitrate, perchlorate, arsenic, antimony, chromium, selenate and/or vanadium ions.

A particular advantage of the invention is its ability to provide treated water with a markedly reduced amount of waste water being produced.

We now have devised a fixed bed system for ion exchange water purification which embodies the advantages of a moving bed system without the size and cost of a moving bed design. The present design involves employing a substantial plurality (at least ten and preferably from about ten to about twenty-five) of fixed bed vessels which do not move but which can be accessed by the various process flows using a series of controller-actuatable valves, for example microprocessor-controlled valves. The system uses closely clustered, fixed position, multiple vessels combined with valves and piping so arranged to obtain the cost advantages of using small mass—produced vessels and valves, and a combination of easily maintained valves.

The present invention achieves (1) high process efficiency, (2) process flexibility, (3) low wastewater production, and (4) construction compactness and maintenance ease.

The invention uses several relatively small diameter fixed vessels each with two ports, one on each opposite end. These ports are closely associated with small volume headers. These headers are connected to manifolds used to conduct the process fluids to and from the vessels. A nest of small, easily-accessible process control valves is mounted between the headers and the manifolds.

Thus, in one aspect this invention is embodied as a system for continuously removing contaminants from contaminated water. This system includes a plurality of immobile vessels, each containing a resin bed capable of binding the contaminants from the contaminated water and yielding purified water and a contaminated resin bed. The vessels each have a first fluid communication opening (port) at a first end and a second fluid communication opening at a second end. The resin bed is located between the two ports.

Each vessel has two headers directly adjacent to the two ports. These headers are connected to the ports with a minimum of dead volume. Each of the headers is directly connected through automatically-actuatable valves to a series of manifolds which supply the various process feeds and accept the various process products.

The actuatable valves are controlled by a controller to flow contaminated water from a manifold through the resin beds in a first subset of the plurality of vessels. This causes these resin beds to remove contaminant from the contaminated water and deposit the contaminant upon the resin in the beds and yield treated water. This treated water is removed from these vessels to a second manifold. The controller sets other valves to simultaneously flow regenerant solution from a manifold through at least one resin bed in a second subset of the plurality of vessels to regenerate its resin bed and to remove spent regenerant solution from these vessels. The controller also directs other valves to flow rinse water from a manifold through at least one regenerated resin bed in a third subset of the plurality of vessels to rinse its regenerated resin bed and to pass spent regenerant and/or used rinse water from the vessels in this third subset.

In another aspect this invention is embodied as a continuous process for purifying water. This process involves the following steps:

Contaminated water is fed through a first manifold to individually-valved first headers each directly adjacent to a first port of a first subset of a plurality of immobile vessels. Each of these vessels contains a resin bed between this first port and a second port. The resin bed is capable of binding contaminant from the contaminated water and yielding treated water and a contaminated resin bed.

Treated water is removed through the second port from each of the vessels in the first subset, and passed through a second individually-valved header directly adjacent to the second port and through a second manifold to a treated water discharge.

Simultaneously, regenerant solution is fed to an individually-valved header directly adjacent to a first or second port on one or more additional vessels making up a second subset of the plurality. Each of the vessels in this second subset contains a contaminated resin bed. The regenerant solution is passed over the contaminated resin bed so that the regenerant displaces the contaminants off of the contaminated resin bed to yield a regenerated resin bed and spent regenerant solution which is removed from the other port on the vessel and through another individually-valved header directly adjacent to this port.

At the same time that the first subset of vessels is removing contaminants and producing purified water, rinse water is fed to an individually-valved header directly adjacent to a first or second port on one or more additional vessels making up a third subset of the plurality. Each of the vessels in this subset contains a resin bed that has been treated with regenerant. The rinse water is passed over the regenerated resin bed to yield a rinsed, regenerated resin bed and used rinse water which is removed from the other port on the vessel and through the individually-valved header directly adjacent to this opening.

In preferred embodiments, the directions of flow of the water regenerant and rinse are specified and the flows of regenerant and rinse are in series through more than one vessel.

DETAILED DESCRIPTION OF THE INVENTION

Brief Description of the Drawings

This invention will be described with reference being made to the accompanying drawings in which.

DESCRIPTION OF PREFERRED EMBODIMENTS

Definitions

Further explanations of the process and systems of this invention use the following terms:

"Bed volume" refers to a volume of fluid passed through a treatment vessel and passed over a bed of resin. A "bed volume" is the volume of an empty vessel and thus need not take into account the volume of resin present in the vessels or the volume of any piping or distributors present within the vessel. Typically, the resin and piping fill about 70% of a bed volume and the head space above the resin and the voids between the resin particles make up about 30% of a bed volume.

"Directly adjacent" and "directly attached" define the relationship between the ports on the ion exchange vessels and the headers associated therewith and set forth that the headers are positioned very close to the ports to minimize fluid hold up volume. These terms have the same meaning when defining the relationship between the headers and the manifolds and between vessels.

"Header" is a zone in a pipe where several other pipes come together.

"Manifold" is a pipe that conducts a process stream from its source to all of the vessels in the ion exchange system.

"Step" refers to a part of the process that is conducted within an ion exchange vessel. The overall process is defined as the sum of all the steps of the process. Many steps may occur simultaneously in the entire group of working vessels, however, any given vessel progresses in an orderly manner through a sequence of steps.

Design Features

The system and method of this invention employ and embody the following design features:

1. A substantial plurality of ion exchange vessels, for example from about ten vessels to about one hundred vessels, are used.
2. Each vessel is equipped with two fluid entry/exit ports, one on either end of the body of resin contained within the vessel.
3. The vessels are located directly adjacent to one another to minimize hold up volume of interconnecting piping.
4. The vessels have headers directly attached to their fluid entry/exit ports.
5. Manifolds are used to conduct the process fluids from a common supply of each fluid to the headers on each vessel.
6. The headers are directly adjacent to their associated manifolds
7. Individual valves are present in the lines directly coupling each manifold to each header.
8. Any process fluid can enter and flow through any vessel or selected group of vessels at any time under the control of the individual valves and an automated controller.
9. Process fluids can flow through several vessels consecutively (as in series configuration) or simultaneously (as in parallel connection) under the control of the individual valves and the controller.
10. The vessels are filled as full as possible with resin to further minimize hold up volume within the vessels.

Figure 1:
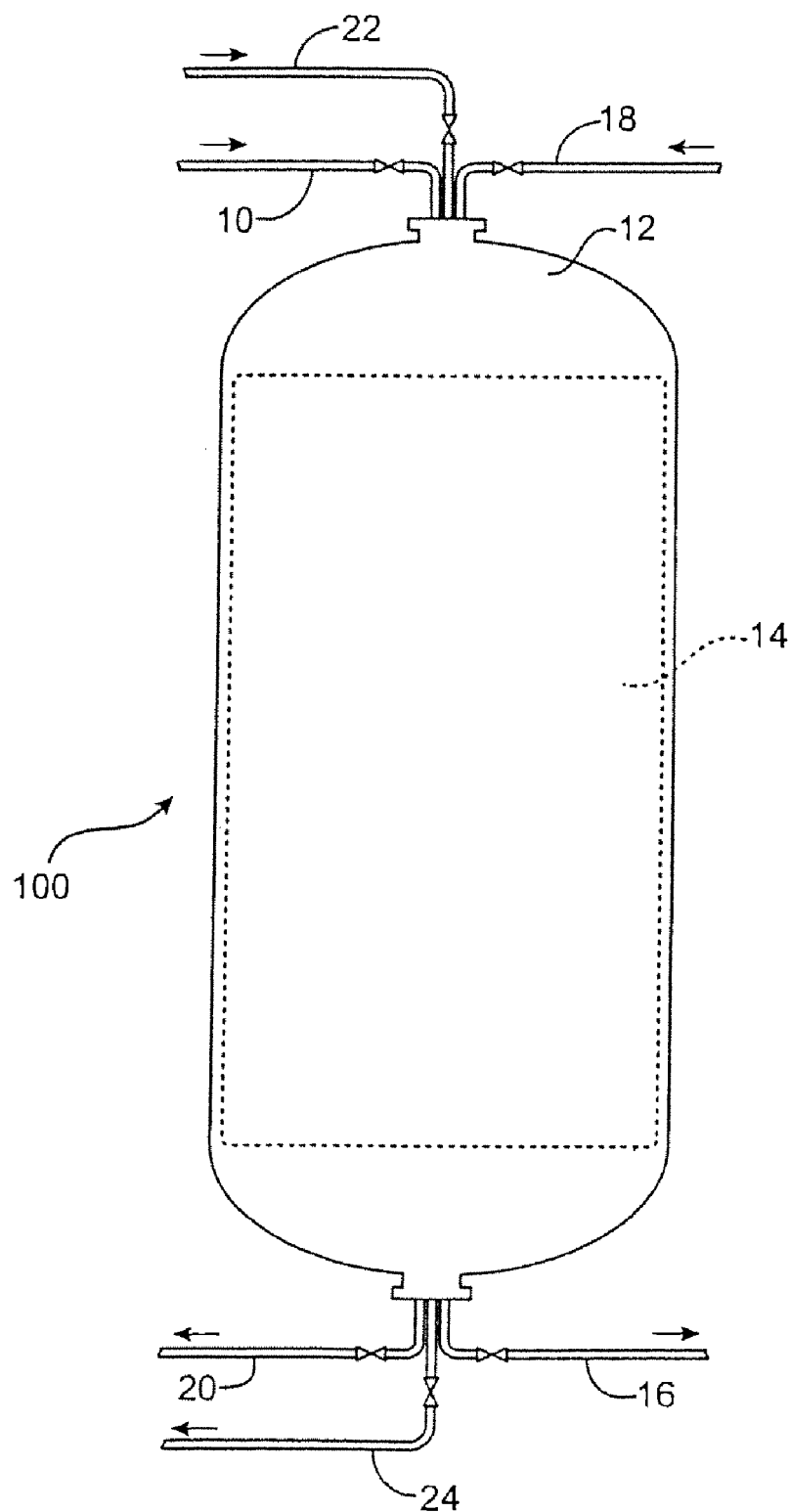
FIG. 1 is a schematic side cross-sectional view of a typical single fixed bed ion exchange unit of the prior art.
Figure 2:
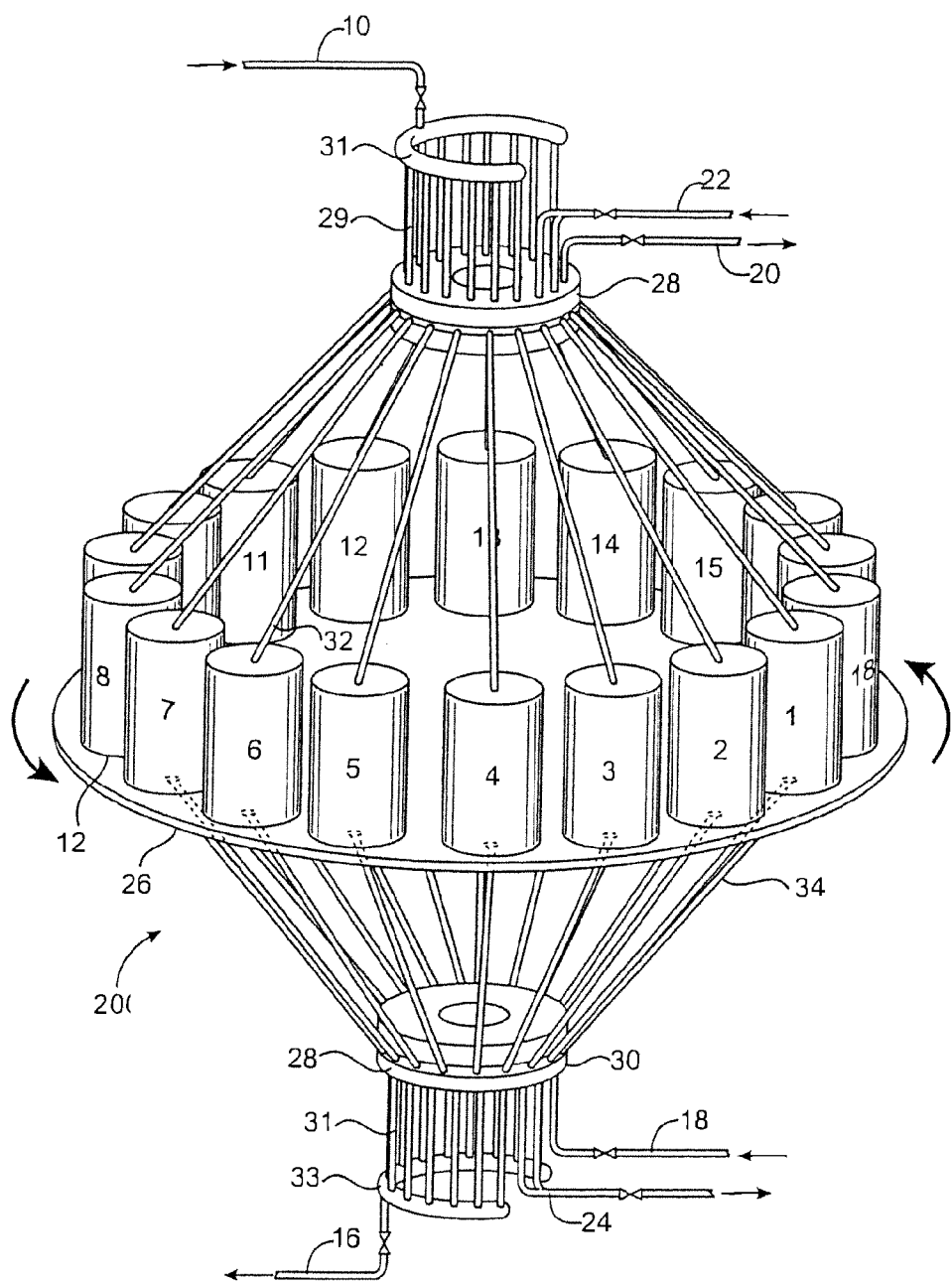
FIG. 2 is a schematic perspective view of a typical multiple moving vessel ion exchange unit of the prior art showing representative process flows.
Figure 3:
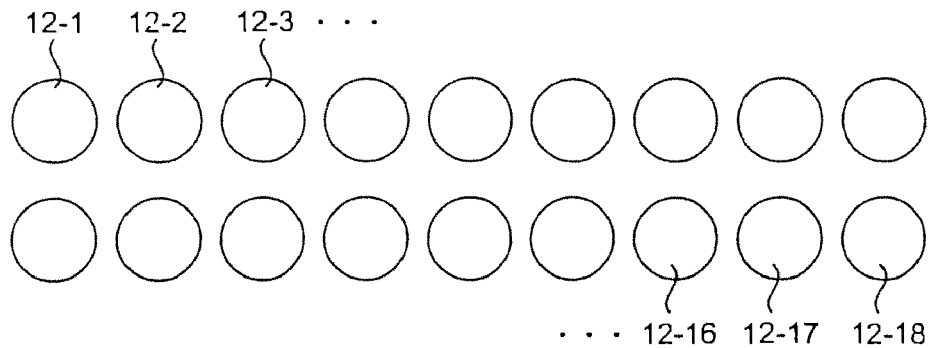
FIG. 3 is a schematic top view of a multiple fixed vessel ion exchange unit of the present invention.

The ion exchange systems of this invention employ a substantial plurality of treatment vessels. FIG. 3 depicts one physical arrangement of the multiple vessels in the system 300 of this invention showing eighteen vessels in two rows of nine vessels each. A piping gallery of manifolds can be located between the two rows directly adjacent to the headers on the vessels. A different configuration could consist of one row of eighteen vessels, three rows of six vessels, or the like with directly adjacent manifold galleries. The number of vessels can vary from about ten to about one hundred vessels but typically from about ten to about thirty vessels and particularly ten to twenty-five vessels.

The vessels are stationary and positioned directly adjacent to each other. Fluid access to the individual vessels is controlled by computer-controlled individual valves between the headers and the manifolds to allow any vessel to be in any step of an ion exchange process. These are generally small, single port valves.

In essence, the invention can be described as consisting of numerous fixed bed vessels closely positioned to each other and to process stream manifolds so as to minimize the process stream piping, whose process stream flows are sequentially controlled and integrated to provide a variety of process designs which are not achievable by conventional systems. The invention uses a cluster of small single port valves located between the headers and the manifolds. The invention uses a programmable logic controller program to regulate and sequence the flows through these valves to and from the vessels. This controller opens or closes the individual valves at each individual vessel to control process streams. The operator, by re-programming the controller, can alter these portions of the process.

Figure 4:
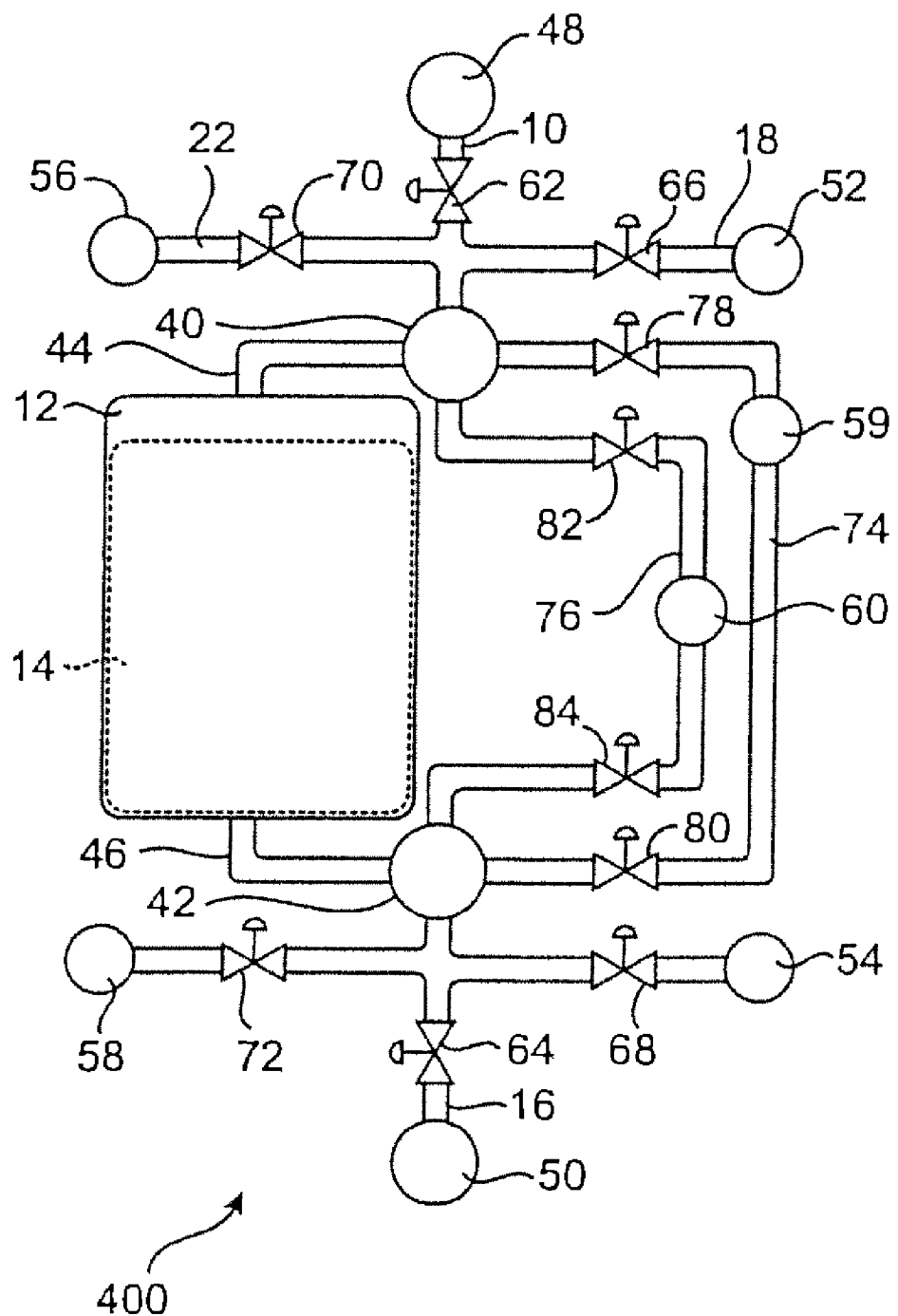
FIG. 4 is a schematic side partially cross-sectional view of an ion exchange vessel and associated piping for use in the multiple vessel, fixed vessel, water purification systems of the present invention.

The relationship of the fluid flows to a typical vessel is shown as system 400 in FIG. 4. There a vessel 12 is depicted filled with resin bed 14. Vessel 12 is equipped with two headers, 40 and 42. These headers are attached to ports located at opposite ends of vessel 12 with resin bed 14 in between them. For the sake of this description, header 40 is shown as the header through which contaminated water is fed and 42 is the header through which treated (purified) water is removed. It will be appreciated that while this downflow mode of operation is most common it is merely representative and that an upflow or side flow configuration could be used if desired. Although not depicted in detail in FIG. 4 the two headers are mounted close to the two fluid access ports on vessel 12. That means that lines 44 and 46 are generally as short as is practical. This minimizes the hold up volume in the system and thus minimizes the amounts of excess fluids which are likely to end up in waste.

In one embodiment as shown in FIG. 4, a series of manifolds, 48, 50, 52, 54 56 and 58, and optionally 59 and 60, surround vessel 12. These manifolds are in valved fluid communication with headers 40 and 42. Manifold 48 distributes untreated water to all of the vessels. Untreated water flows through line 10 and valve 62, when open, to header 40 and thence through line 44 to vessel 12. Again, the distance from valve 62 to header 40 should be as small as possible to minimize fluid hold up. Treated water is removed via line 46 to header 42 and thence though valve 64, when open, and line 16 to manifold 50 for collection and discharge as purified product water. Multiple vessels will be carrying out the same process step with their valves 62 and 64 set to allow the flow of untreated water from manifold 48 to these vessels and the collection and discharge of treated water out through manifold 50.

When the resin bed 14 becomes contaminated or otherwise loses efficiency and requires regeneration, the flow of untreated water can be halted and a regenerant solution can be fed from manifold 52 through line 18 and valve 66 to header 40. In one generalized mode of operation, this flow of regenerant will push treated water out of vessel 12. This water can be passed out through header 42 and manifold 50. When regenerant breakthrough is about to occur at the base of resin bed 14, valve 64 can be closed and spent regenerant can be redirected from header 42 through valve 68 and line 20 to manifold 54 for disposal. Once regeneration is complete, the flow of regenerant from manifold 52 can be halted and rinse water, which is typically treated water, can be fed from manifold 56 through line 22 and valve 70 to header 40. This rinse water flow can initially push out regenerant such as to manifold 54. Thereafter, the rinse water flow can either be directed through valve 68 to manifold 54 or be routed through line 24 and valve 72 to manifold 58 for disposal or other use.

After a suitable volume of rinse water has been passed over the resin bed to reduce the amount of regenerant in the effluent, this vessel is ready to be reinstalled in service, purifying water.

One of skill will recognize that there are several variations of the flows during regeneration and rinsing. For example, flows can be cocurrent or countercurrent. Flows can move from vessel to vessel, displacing and pushing vessel contents.

System 400 optionally includes one or two or more additional manifolds. These manifolds are referred to as "intermediate manifolds" or "transfer manifolds". Two such manifolds are shown as manifolds 59 and 60 which are located in lines 74 and 76, respectively. Line 74 contains valves 78 and 80 and line 76 includes valves 82 and 84. Lines 74 and 76 each span headers 40 and 42. These optional manifolds connect to all of the vessels and by opening and closing valves 78, 80, 82 and 84 appropriately make it possible to reroute flows from one vessel to another vessel. This rerouting through the intermediate manifolds makes it possible to achieve upflow or downflow operation in individual steps in individual vessels if desired. It also allows parallel flows to be converted into series flows and vice-versa These variations using intermediate manifolds will be described in further detail with reference to the representative overall process flows depicted in FIGS. 7 and 8.

Figure 5:
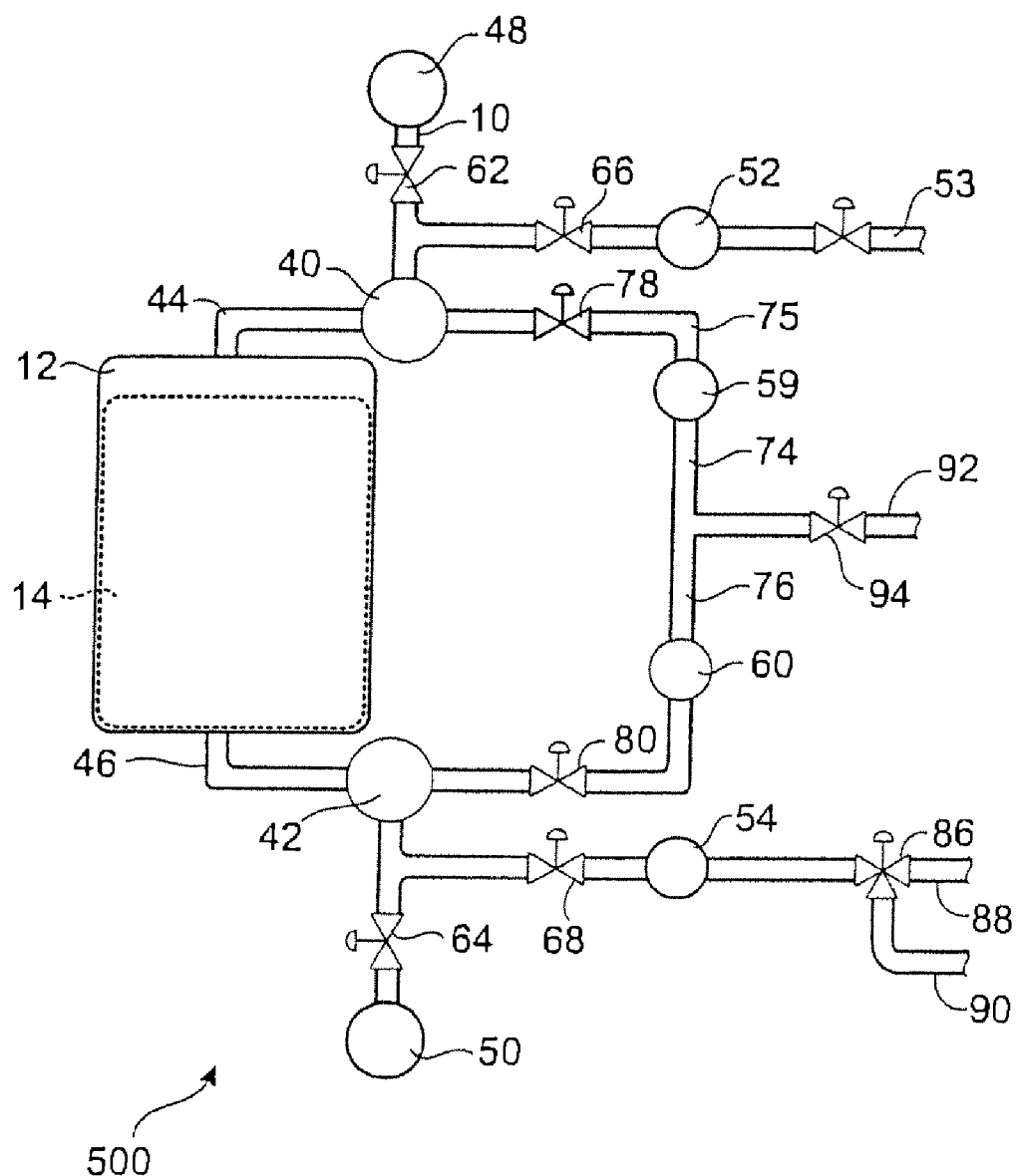
FIG. 5 is a schematic side cross-sectional view of an ion exchange vessel similar to that shown in FIG. 4 with a simplified piping scheme. The vessel is set up for use in the multiple vessel, fixed vessel, water purification systems of the present invention with cocurrent treatment and regeneration.

Turning to FIG. 5, a second representative vessel configuration, system 500, is shown. As compared to system 400, system 500 is somewhat less complicated and uses somewhat fewer parts and for these reasons is generally preferred, particularly for processes which employ downflow purification and cocurrent (downflow) regeneration.

System 500 has many of the features of system 400 shown in FIG. 4 which need not be repeated. System 500 has two intermediate manifolds 59 and 60. but both are mounted on a common line 75/74/76 containing valves 78 and 80 and spanning the two headers 40 and 42 on vessel 12.

System 500 is further simplified by having a manifold 52 which can be used to supply regenerant cocurrent to the water treatment flow.

Spent regenerant is taken off via manifold 54 and transferred via 3 way valve 86 either to regenerant storage via line 88 or to waste via line 90. Regenerant can also be routed from header 42, as it leaves column 12, through valve 80, through intermediate manifold 59 or 60 to a second vessel where by opening a valve corresponding to valve 78 or valve 80 the regenerant can be flowed over the resin in this second vessel in cocurrent or countercurrent flow. This flow of regenerant through the intermediate manifolds and lines 74 and 75 can also be directed to the regenerant storage via line 92 and valve 94.

Rinse water, which is treated water, is available in manifold 50 and can be fed via valve 64 upflow into header 42 and thence to column 12. This rinse can flow out via line 75 to manifold 59 and then to an adjacent vessel or via line 92 and valve 94 to regenerant storage as make up water. Rinse water can also be routed for downflow feed via intermediate manifolds 59 or 60.

As shown, the intermediate manifolds 59 and 60 can be used to reroute flows from one vessel to another vessel. For example, regenerant solution, particularly when only partially spent, could be passed from a first vessel through intermediate manifold 60 or 59 to an adjacent vessel where it could pass through that second vessel's valve 78 and thence to header 40 and into that second vessel for additional regeneration duty.

In both of the systems 400 and 500 the water flow and regenerant flow are each downflow and the rinse water is either fed to the top or bottom manifold for cocurrent downflow or countercurrent upflow. While one could, in theory, use intermediate manifold 59 or 60 to reroute the regenerant flow to countercurrent (upflow) if such flow was called for, this would not be practical for continuous operation. In this case, it would be more sensible to connect up the feed and product lines to achieve the desired flow direction.

Figure 6:
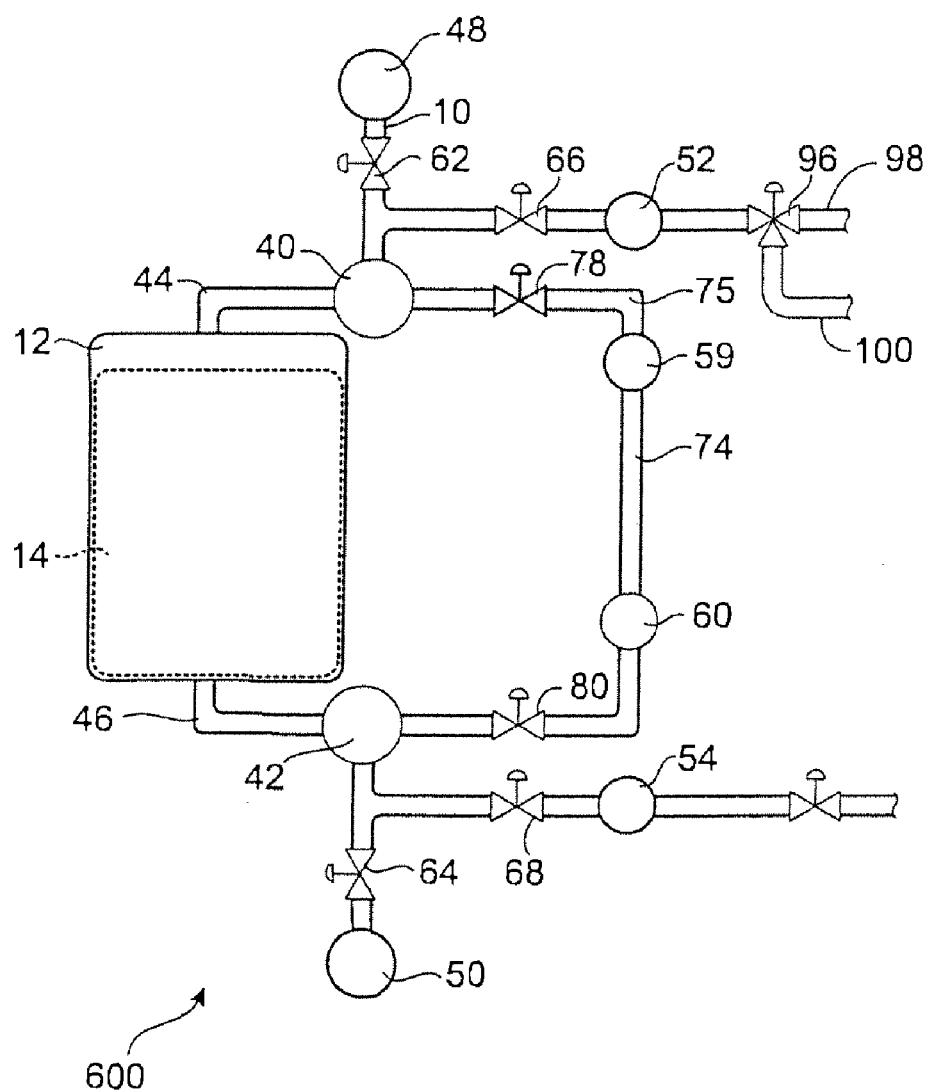
FIG. 6 is a schematic side cross sectional view of an ion exchange vessel similar to that shown in FIG. 5 but set up for countercurrent regenerant flow.

A representative countercurrent (upflow) regeneration system is shown in FIG. 6 as system 600. In this system regenerant is fed through manifold 54 and valve 68 to lower header 42. Rinse water is available from manifolds 50 for upflow feed as well. Effluents can be taken off via line 44 and recycled to a second resin bed via line 75 and valve 78 via transfer manifold 59 or 60, discharged to waste via three way valve 96 and line 98 or sent to the regenerant tank via valve 96 and line 100.

In typical operation, vessels configured as shown in FIG. 4, 5 or 6 spend most of their time in service purifying water and a shorter period being regenerated. The flow rate of water being treated also is substantially greater than the rates needed for regeneration and rinse. Accordingly, the manifolds and piping for the water treatment flows can be of larger size than the piping for regenerant and rinse flows. This is a particular advantage of the present invention in that the individual vessels can be treated individually according to different time cycles at different steps by control of the valves feeding and removing flows. With the prior art moving bed designs, all beds moved simultaneously and the times for each step were locked to the bed movement cycle.

Figure 7:
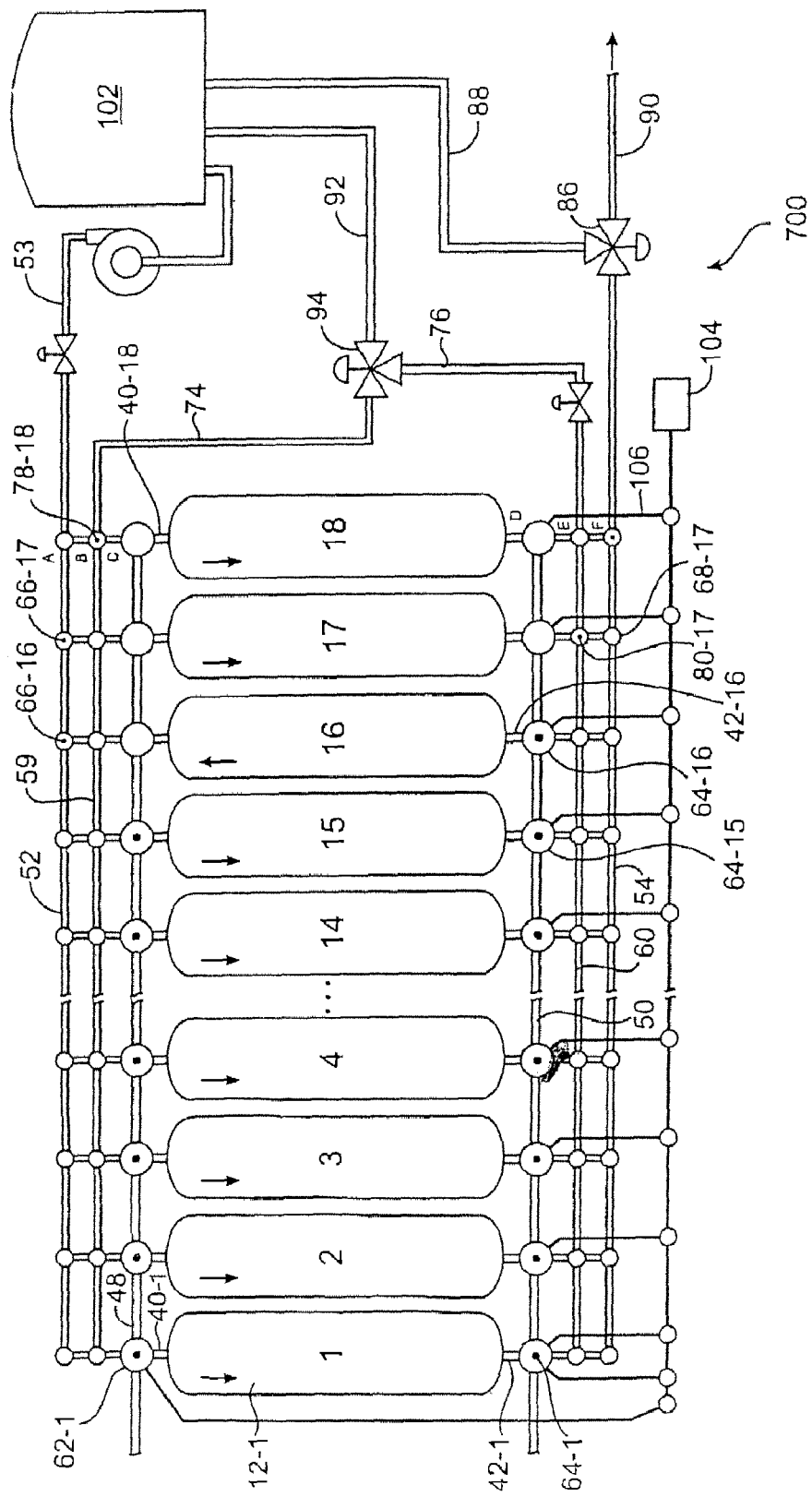
FIG. 7 is a schematic side elevational view of a multiple fixed vessel ion exchange system 700 of the present invention showing representative process flows.

A first embodiment of the overall system of the invention is shown in FIG. 7 as system 700. System 700 includes eighteen vessels 12-1 through 12-18, where eighteen is a representative number in the range of ten to twenty-five or greater. Each vessel is numbered with an identifier "1", "2" . . . "18" to identify its unique position in the overall system. Each vessel is configured for cocurrent flow of treatment water and regenerant essentially as set out in FIG. 5 and is equipped with headers, manifolds, lines and valves as described with reference to FIGS. 4 and 5. These elements are numbered in accord with the numbering used in FIGS. 4 and 5 with an added indication if a particular element is associated with a particular vessel. For example, header "40-1" is the "40" header associated with vessel 1.

Each of the eighteen vessels contains a bed of ion exchange resin and each has a header 40-1, etc which provides access to the vessel and to contaminated water supplied by feed manifold 48, via valves 62-1 etc. In the view shown, valves 62-1 through 62-15 are shown with a black dot to indicate that contaminated water is feeding through these valves and through the resin beds in vessels 12-1 through 12-15. Purified water is being withdrawn from these fifteen vessels through headers 42-1 and valve 64-1, etc and collected in manifold 50 for use. Again, valves 64-1 through 64-15 all are shown with a dot to show a positive fluid flow.

Vessels 12-16 through 12-18 are not in service purifying water. The resin beds in vessels 12-17 and 18 are undergoing regeneration with a brine solution and the bed in vessel 12-16 is being rinsed to remove spent brine prior to being returned to service.

In a very straight forward approach, this regeneration could be carried out by passing fresh brine from tank 102 through beds in vessels 12-17 and 12-18 with the effluent going to waste via line 90. Rinse water could be fed to vessel 12-16 from manifold 50 and this rinse water could also be passed to waste line 90 via intermediate manifolds 59, 54 and 60 and lines 74 and 76. This would lead to large volumes of waste, however, and is not preferred. A more efficient process would minimize the volume of waste generated.

In a representative preferred process, vessel 12-18 is taken out of service filled with water. Regenerant brine that has already been partially used by being first passed downflow through vessel 12-17 is passed through manifold 60 and 59 to the top of vessel 12-18 and passed downflow through that vessel. The volume of this flow of brine is generally from at least about ½ a bed volume to about 3 bed volumes and especially from about 1 to about 2 bed volumes. The first about ⅓ bed volumes of regenerant fed to vessel 12-18 displaces the water present in the vessel. This volume of water can be sent to product water via manifold 50 or it can be discarded, or it can be sent to the brine tank 102 via manifold 54 valve 86 and line 88. This last alternative is preferred. The remaining regenerant passing through vessel 12-18 at this stage can be recycled to the brine tank together with the water but preferably up to about one bed volume is sent to waste via manifold 54, valve 86 and line 90.

The volume of used regenerant fed to vessel 12-18 is equal to a volume of fresh regenerant fed to vessel 12-17 via line 53 and manifold 52. Thus, at the completion of this stage of regeneration, vessel 12-18 is full of used regenerant and vessel 12-17 is full of fresh regenerant.

Controller 104 then reconfigures the valves associated with vessels 12-16, 12-17 and 12-18 for the next stage of regeneration. In this stage, fresh rinse water is passed from manifold 50 through valve 64-16 upflow through vessel 12-16. Vessel 12-16 is full of used rinse water previously added as will be described. The fresh rinse water, ½ to about 1 bed volumes and preferably about ⅔ of a bed volumes, pushes used rinse water from vessel 12-16 to manifold 52 where it passes through valves 66-16 and 66-17 and flows downflow into vessel 12-17 now pushing the fresh brine previously added to 12-17 before it. This about ⅓ bed volumes of fresh brine followed by some amount of rinse water, typically at least about ⅙ bed volumes to about 1 bed volumes and especially about ⅓ bed volumes, are taken off via manifold 60 and passed though lines 76, valve 94 and line 92 to brine tank 102.

The fresh brine employed in the regeneration steps is most commonly common sodium chloride solution. This regenerant solution commonly contains from about 2% by weight to about 15% by weight sodium chloride, especially 4 to 12% and more especially 5 to 10 and particularly about 8% by weight sodium chloride.

At this stage in the regeneration process, vessel 12-16 has been completely rinsed and is ready to be placed in service. Vessel 12-17 is full of partially used rinse water and vessel 12-18 is full of partially used regenerant brine. When the next vessel comes off line, for example vessel 12-1, 12-16 will go into service. The regeneration cycle begins anew with fresh brine being fed into vessel 12-18 to displace brine into vessel 12-1. Thereafter fresh rinse liquid will be added to vessel 12-17 to displace its rinse liquid contents to vessel 12-18.

As can be seen, the one stage where liquid leaves the system during regeneration is when regenerant that has passed though two vessels and is sent to waste. In accord with this process the volume of such liquid lost from the system is made up by the volume of water displaced out of the vessel when it first enters regeneration and by the volume of fresh rinse water added to the system by the final rinse. Accordingly, the volumes of these several flows need to be coordinated to maintain a relatively constant system volume.

All of these valve and pump functions are controlled by a controller. Controller 104 opens and closes the various valves so that individual vessels can function as water purifiers or can be operated in regeneration or rinse modes. Controller 104 can operate on a preset time sequence, sequencing the various vessels through the different stations according to a preset schedule. Alternatively, controller 104 can operate based upon analytical results based on samples fed to it by sample lines 106 and associated analytical equipment which measures the composition of the outflows from individual vessels and cause the system to process from station to station based on the results of these measurements. The presently preferred method of control processes the vessels based upon the volume of water passed through them and the operator's knowledge of the capacity of the resin beds.

Controller 104 is a programmable logic controller as is marketed by Alan Bradley or by Square D under the Modicon name. This computer-driven controller operates a program which translates a sequence of programmed commands into a series of signals which drive the various valves and pumps in the system in an appropriate sequence to carry out the process.

System 700 is shown with all in service vessels and all vessels in regeneration operating downflow and the vessel in final rinse operating upflow. As the various vessels cycle into these various stations the flow direction is set accordingly, not by repiping but rather by controlling valves and by the passing the flows through intermediate manifolds 59 and 60, with controller 104.

System 700, with the flow directions just described, has proven very effective for treating water having nitrate as a principal contaminant.

Figure 8:
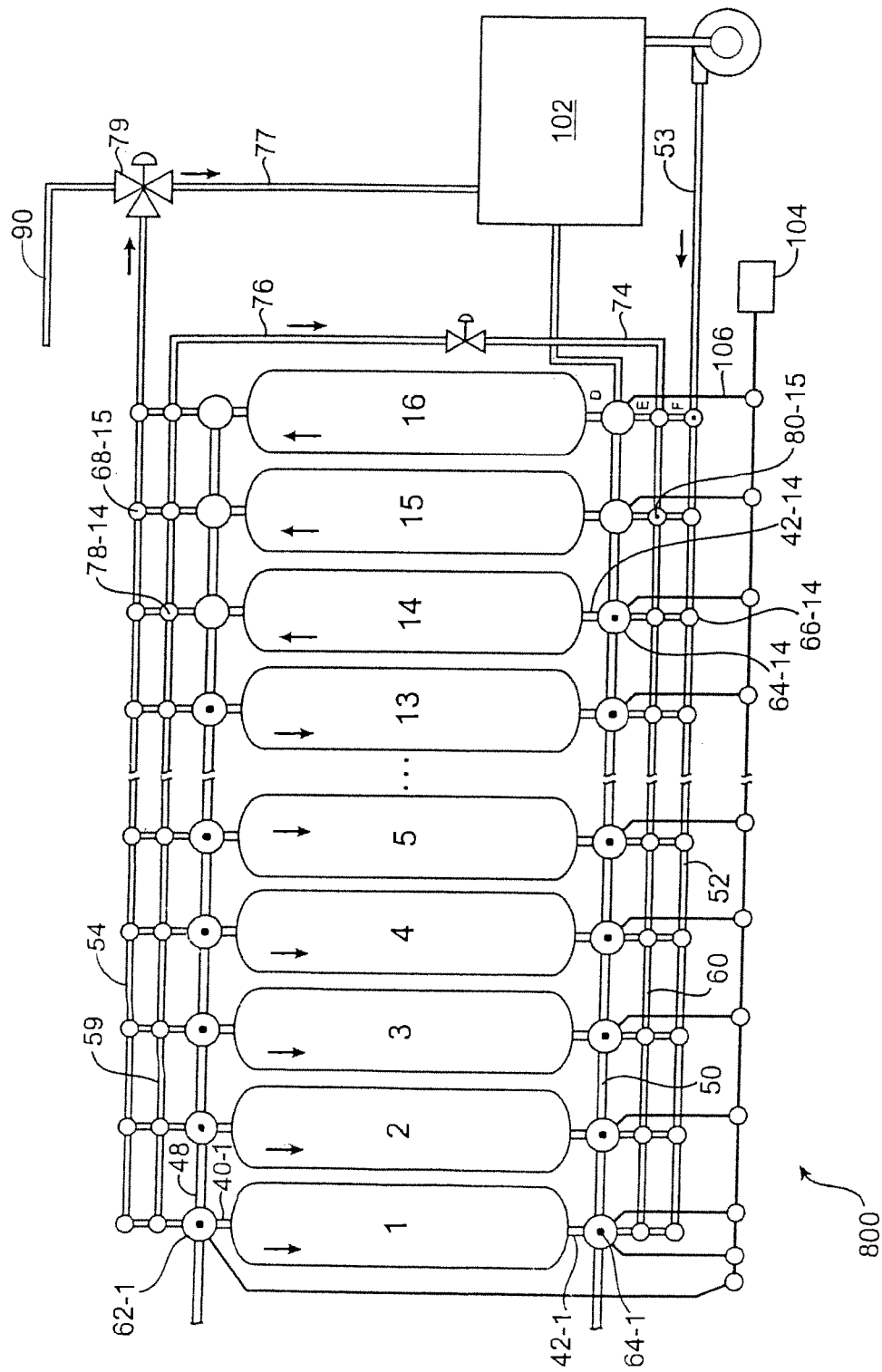
FIG. 8 is a schematic view of a system 800 corresponding to the system of FIG. 7 but adapted specifically for countercurrent regeneration.

A second embodiment of the overall system of the invention is shown in FIG. 8 as system 800. System 800 includes sixteen vessels 12-1 through 12-16. The numbering of elements of the process is in accord with the numbering used with FIG. 7. Contaminated water is feeding through the resin beds in vessels 12-1 through 12-13. Purified water is being withdrawn from these thirteen vessels through headers 42-1 and valve 64-1, etc and collected in manifold 50 for use. Again, valves 64-1 through 64-13 all are shown with a dot to show a positive fluid flow.

Vessels 12-14 through 12-16 are not in service purifying water. The resin beds in vessels 12-15 and 16 are undergoing regeneration with a brine solution and the bed in vessel 12-14 is being rinsed to remove spent brine prior to being returned to service. As noted above, this regeneration could be carried out with substantial volumes of regenerant and rinse going to waste. It could also be carried out with substantially reduced waste, for example as follows:

In this representative preferred process, vessel 12-16 is taken out of service filled with water. Regenerant brine that has already been partially used by being first passed upflow through vessel 12-15 is passed through manifolds 60 and 59 and lines 74 and 76 to the bottom of vessel 12-16 and passed upflow through that vessel. The volume of this flow of brine is generally from at least about ½ of a bed volume to about 3 bed volumes and especially from about 1 to about 2 bed volumes.

The first about ⅓ bed volumes of regenerant fed to vessel 12-16 displaces the water present in the vessel. This volume of water can be sent to product water or it can be discarded via line 90, or it can be sent to the brine tank 102 via manifold 54, valve 79 and line 77. This last alternative is preferred. The remaining regenerant passing through vessel 12-16 at this stage can be recycled to the brine tank together with the water but preferably up to about one bed volume is sent to waste via manifold 54, valve 79 and line 90.

The volume of used regenerant fed to vessel 12-16 is equal to a volume of fresh regenerant fed to vessel 12-15 via line 53 and manifold 52. Thus, at the completion of this stage of regeneration, vessel 12-16 is full of used regenerant and vessel 12-15 is full of fresh regenerant.

Controller 104 then reconfigures the valves associated with vessels 12-14, 12-15 and 12-16 for the next stage of regeneration. In this stage, fresh rinse water is passed from manifold 50 through valve 64-14 upflow through vessel 12-14. Vessel 12-14 is full of used rinse water previously added as will be described. The fresh rinse water, ½ to about 1 bed volumes and preferably about ⅔ of a bed volumes, pushes used rinse water from vessel 12-14 to manifold 59 and 60 and line 76 where it passes upflow into vessel 12-15 now pushing the fresh brine previously added to 12-15 before it. This about ⅓ bed volumes of fresh brine followed by some amount of rinse water, typically at least about ⅙ bed volumes to about 1 bed volumes and especially about ⅓ bed volumes, are taken off via manifold 54 and passed though valve 79 and line 77 to brine tank 102.

At this stage in the regeneration process, vessel 12-14 has been completely rinsed and is ready to be placed in service. Vessel 12-15 is full of partially used rinse water and vessel 12-16 is full of partially used regenerant brine. When the next vessel comes off line, for example vessel 12-1, 12-14 will go into service. The regeneration cycle begins anew with fresh brine being fed into vessel 12-16 to displace brine into vessel 12-1. Thereafter fresh rinse liquid will be added to vessel 12-15 to displace its rinse liquid contents to vessel 12-16, etc.

System 800, with the flow directions just described, has proven very effective for treating water having arsenic as its principal contaminant.

Figure 9:
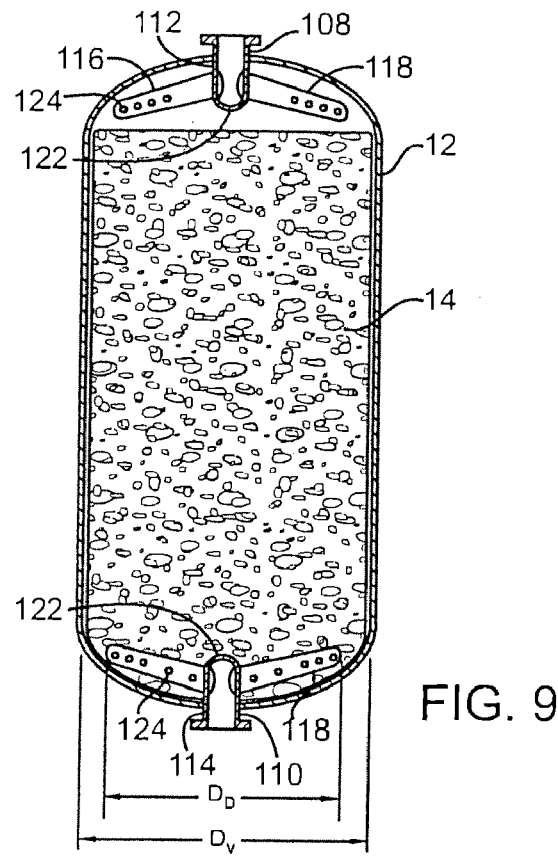
FIG. 9 is a schematic cross-sectional view of an ion exchange vessel used in the systems of the invention showing that preferably the ion exchange resin substantially fills the vessel and illustrating representative distributors for assuring a proper fluid flow through the vessel.
Figure 10:
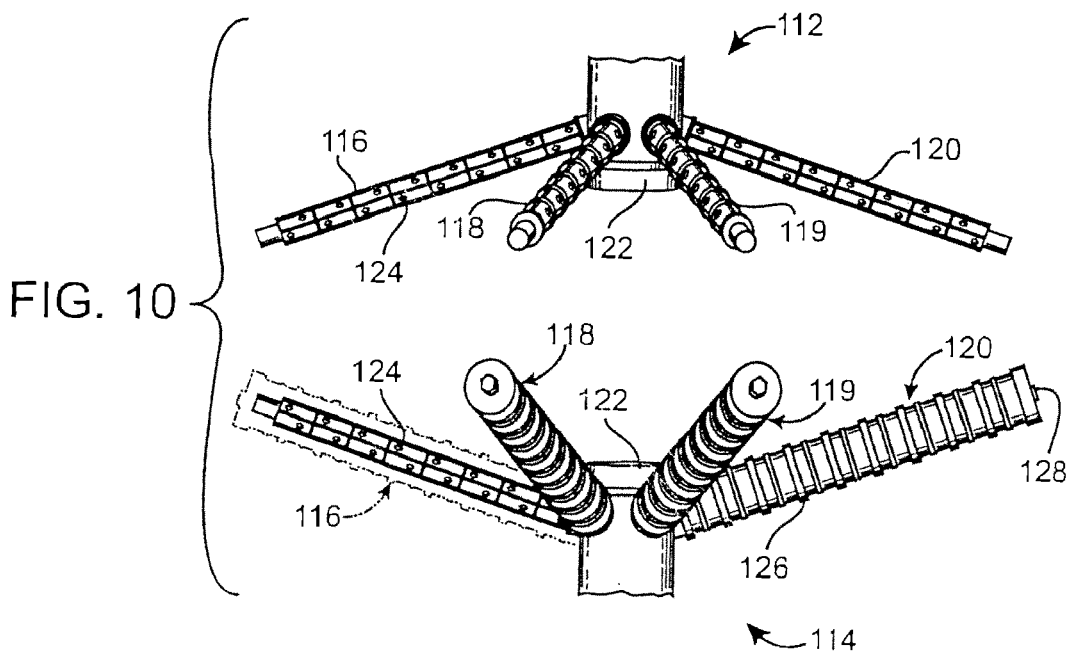
FIG. 10 is a detail of FIG. 9 showing fluid flow distributors.

Turning to FIGS. 9 and 10, several details of the vessel 12 preferably employed in the process and system of this invention are shown. Vessel 12 holds resin bed 14. Resin bed 14 substantially fills vessel 12, for example filling at least about 85%, and preferably at least about 90% and more especially at least about 93% of the vessel volume. (In all cases these percentage fill values are based upon swollen resin in a ready to use state.) Resins suitable for use in water treatment units have been described in the art and are selected depending upon the nature of the contaminant being removed. Table I lists a variety of available resins which can be used and describes the contaminants which they remove.

TABLE I

The ion exchange resins which are presently preferred for use in the process of the invention are strong base resins. These resins are based on various polymer structures such as polystyrene with cross-linkers and with appropriate active groups such as quaternary ammonium attached:

Prolate Strong Base Resins Type 1 and Type 2
Amberlite IRA-400
Amberlite IRA-900
Dowex SBR
Ionac ASB-1
Ionac AFP-100
Dowex SBR-P TABLE I-continued The ion exchange resins which are presently preferred for use in the process of the invention are strong base resins. These resins are based on various polymer structures such as polystyrene with cross-linkers and with appropriate active groups such as quaternary ammonium attached:

Dowex 11
Duolite A-102-D
Ionac ASB-2
Amberlite IRA-93
Amberlite IR-45
Purolite A-400
Purolite A-600
Ionac A-260
Dowex WGR
Sybron SR6
Sybron SR7
Reillex ™HPQ Resins (based on polyvinyl pyridene polymers)
Nitrex Other ion exchange resins which are applicable to the invention such as for treating various cations are strong acid or weak base type resins such as:

Amberlite IR-120

Ionac C-20

Prolate C-100

Ionac C-270

Amberlite-200

Ionac CFS

Generally, the strong base type I resins, particularly those based on polystyrene backbones, give good overall results removing nitrate and perchlorate as well as arsenic and the like and are preferred.

Fluid flows into and out of vessel 12 are through fluid ports 108 and 110, located at opposite ends of the resin bed. In preferred embodiments of this invention, the fluid flows into and out of the vessel take place through fluid distributors, provided to spread the flow of liquid evenly over the resin bed and to achieve a consistent flow of liquid over the resin bed. This provides maximum efficiency during use in service and also during regeneration.

One approach to fluid distribution is to employ distributors such as 112 and 114. These distributors may have a plurality of distribution laterals 116, 118, 119 and 120 extending radially from a hub 122. Most commonly there are at least four laterals in each distributor with from four to eight and especially six laterals being most common. The distribution laterals each have a plurality of holes 124 through which liquid can flow. These holes can be essentially evenly spaced over the length of the laterals. It has been found that better results are often achieved if the holes are distributed more heavily on the outer ends of the distribution laterals. This tends to promote a more even and consistent flow over the bed of resin. On the upper distributor 112 the holes 124 are concentrated toward the outer end of the laterals. On the lower distributor 114 the holes 124 are spaced along the laterals but with the spacing between inner holes being greater than between outer holes.

Since the lower laterals may be buried in resin or may come in contact with resin lines during downflow operation, they commonly are shielded by a screen 126 which are closed by cap 128.

The length of the distribution laterals is typically selected to give a distributor diameter ($D_D$) which is about 66% to about 75%, and especially about 70% of the inside diameter ($D_v$) of cylindrical vessel 12.

The flow rate of fluid through the vessels can play a part in determining the efficiency of the system. Obviously, a very low flow rate would lead to a very low throughput for the system. Conversely, a very high flow rate could lead to inadequate treatment or inadequate regeneration or rinsing. On a commercial scale, the resin beds are from about two feet to about six feet in depth (length). Good results are achieved with such beds if the flow rate of liquid over the resin bed, either upflow or downflow, is from about six gallons per minute per square foot of resin bed area (gpmft$^2$) to about sixteen gpmft$^2$. Flow rates of eight to fourteen gpmft$^2$ and especially about twelve gpmft$^2$ give very good results particularly, when flowing contaminated water over the resin beds for treatment. While these flow rates may used during each of the process steps, during regeneration and rinse it is generally advisable to keep the flow rates of regenerant and rinse at or about eight gpmft$^2$.

A major process advantage of the present is the higher regeneration efficiency, as measured by smaller volumes of brine and rinse being sent to waste, which it achieves.

Figure 11:
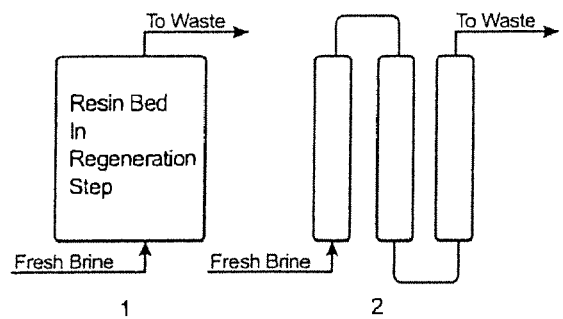
FIG. 11 is a schematic cross-sectional view of two sets of ion exchange vessels, illustrating a regeneration scheme of the prior art and a regeneration scheme in accord with the present invention.
Figure 12:
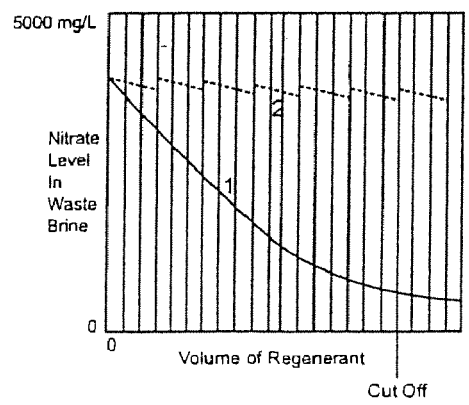
FIG. 12 is a graph comparing regeneration efficiency of the two regeneration schemes illustrated in FIG. 11.

As illustrated in FIGS. 11 and 12, with a single fixed bed, during regeneration, the contaminant level in the waste brine is initially quite high but drops rapidly as the regeneration is completed. This means that the overall concentration is not optimal and that the volume of brine is large.

As also shown in FIGS. 11 and 12 with the present invention, it is possible to route a regenerant brine through 2, 3, 4 or more vessels in series, varying the flow upflow and downflow as desired. This allows the brine exiting a first vessel at the end of its regeneration cycle and thus incompletely loaded with contaminant, to pass through one or more additional, more contaminated, vessels and then to become fully leaded before being sent to waste. This multi-vessel regeneration is referred to as a "gradient regeneration".

The brine savings produced by the system of this invention over that of the fixed bed system is at least 25% and often 50% or greater.

A typical regeneration/rinse cycle, using the present invention generates at most about one bed volume of total waste.

When the regeneration begins, used brine first pushes ⅓ bed volumes of water out of the newest, most contaminated, vessel. This ⅓ bed volume of water is passed to the brine make up tank.

Next one bed volume of used brine is passed through that vessel. This one bed volume of used brine is sent to waste. This is the sole fluid sent to waste during this regeneration cycle. About ⅓ bed volumes of fresh brine have been fed to the preceding vessel during this cycle but this material only leaves the system as used brine exiting the most contaminated vessel.

During the rinse portion of the cycle, no waste is generated. instead the waste from generates ⅔ of a bed volume of spent rinse water which is passed to the brine make up tank as make up. Thus, overall waste levels at least as low as 0.3% are achieved during nitrate removal and as low as about 0.01% or lower with arsenic removal.

The invention will be further described with reference to the following Examples in which the removal of representative contaminants is demonstrated.

Example 1

Nitrate Removal

This example shows the removal of nitrate ion from a ground water source as practiced on a continuous, pilot scale basis. A representative analysis of the feed water showed the following:

|  | Typical | Actual |
| --- | --- | --- |
| nitrate | 45-200 mg/L | 52 |
| chloride | 35-200 mg/L | 44 |
| sulfate | 0-300 mg/L | 100 |
| bicarbonate | 60-200 mg/L | 98 |

The product water contained on average 6 mg/L of nitrate and less than 1 mg/L of sulfate.

The feed water was fed into a purification system substantially as shown in FIG. 7 as 700. Sixteen to eighteen vessels were used at various times during the run. Each vessel was 36 inches in diameter by 48 inches high. Each contained about 25 ft.$^3$ of an ion exchange resin. Commercial strong base type I an ion exchange resin having a DVB cross-linked polystyrene matrix and type I quaternary ammonium functional groups was used. This resin was in the form of beds of typical resin bed size ¹⁄₁₆-¹⁄₆₄ inch diameter. These vessels were placed in service together and removed from service sequentially. Eventually the vessels were cycling so that one vessel placed in service became loaded with contaminant, and thus in need of regeneration about every 35-45 minutes. All 16-18 vessels were regenerated about once every 10-12 hours At most times 13 to 15 vessels were in service with three vessels in regeneration and rinse. The nominal flow rate of the system was 1000 gpm. The vessel regeneration cycle was one recycle every 300 bed volumes of treated water.

Brine (8% by weight NaCl) was used as regenerant.

The flow directions were as follows:

| Absorption | all downflow |
| --- | --- |
| Regeneration | all downflow (cocurrent) or last stage upflow and others downflow |
| Rinse | upflow or downflow with final stage upflow (countercurrent) |

This arrangement gives high nitrate removal efficiency which saves operating costs and minimizes the production of waste.

The regeneration cycle is as described with reference to system 700 in FIG. 7. At the completion of the adsorption step the ion exchange bed had contaminants distributed as follows: The nitrate contaminant is concentrated at the bottom of the bed and sulfate is concentrated at the top of the bed.

The first stage of regeneration, with used brine, removes sulfate and nitrate. Most of the sulfate will be removed from the column and only a portion of the nitrate will be removed, leaving some nitrate at the bottom of the column. The second stage of regeneration with fresh brine polishes this bed by removing remaining traces of nitrate.

The bed was then rinsed with water as shown in FIG. 7.

The overall efficiency of the process is very high. Nitrate has been reduced to 6 mg/L. The volume of waste was 0.3%, based on the volume of purified water generated.

Example 2

In this case perchlorate (in the range of 10 to 1000 micrograms/liter), a contaminant in addition to nitrate, is present in the water supply. The process must now be able to remove nitrate and perchlorate. The ion exchange beds 14 in vessels 12 which are effective for removing nitrate will remove perchlorate as well. The regeneration set forth in Example 1 is not optimal in the case of a nitrate and perchlorate-loaded resin, however. Typically, perchlorate is bound very tightly to the resin and is often localized at the leading edge of the absorption beds. Regeneration with brine (as described in Example 1) is the regeneration method of choice but cocurrent brine flow (that is downflow when absorption has been downflow) is less effective than is the case following nitrate absorption. Regenerating the bed initially in a downflow (cocurrent) mode, the perchlorate is not entirely removed from the bed but to some extent is only transported downward into the bed.

The invention allows the process to be easily changed to enable it to remove both perchlorate and nitrate from the beds in an efficient manner during regeneration. By reconfiguring the flows with controller 104, changes can be carried out. First, if a longer regeneration period is needed, the proportion of vessels in regeneration can be increased. For example, instead of 13 vessels in service, two in regeneration and one in rinse, 12 vessels could be left in service while three are in regeneration and one is in rinse. Second, the flow direction of the regenerant brine can be redirected in one or more vessels to achieve countercurrent regeneration favored when perchlorate is present.

In this example, the vessels could be configured as set forth in FIG. 8 with 16 vessels in total and counter current regenerant flow.

As previously described, fresh brine fed to the second regeneration stage displaces spent brine which in turn displaces water present when the vessels are taken out of service. The rinse cycle described in example 1 is used. The typical duty cycle and waste generation levels would be essentially the same as those demonstrated in Example 1.

Nitrate removal would remain at the same high levels shown in Example 1. Perchlorate levels would be significantly reduced, as well.

Example 3

Arsenic Removal

The system of the invention is useful for removing arsenic from water. An overall process is illustrated in FIG. 13.

Figure 13:
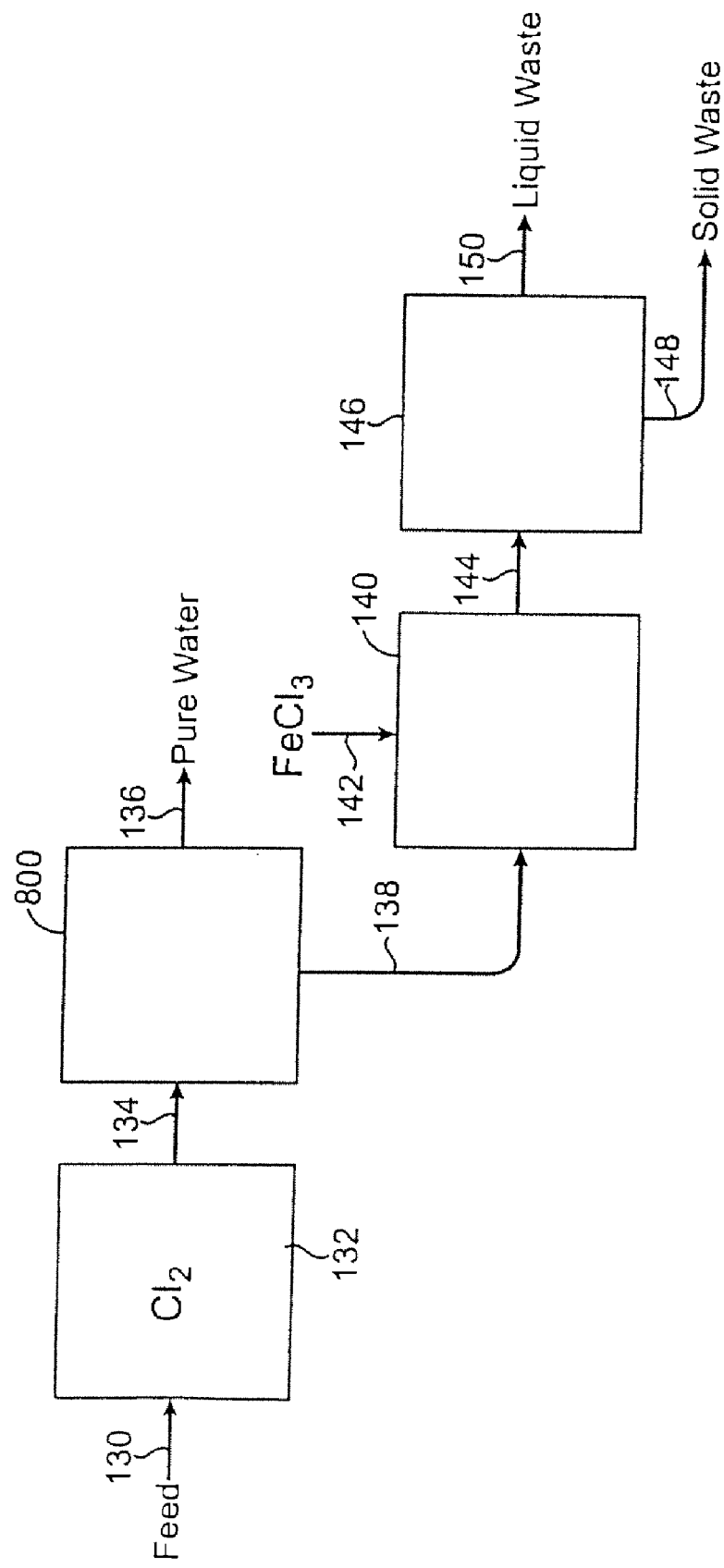
FIG. 13 is a block diagram showing the use of an ion exchange system of this invention in an overall process for removing arsenic from waste water.

The ion exchange unit was substantially in accord with system 800 in FIG. 13. Since this was a test system, the number of vessels was reduced to six, three in absorption, two in regeneration and one in rinse. In a commercial scale unit, additional vessels would be present in service in absorption for a total of at least 10 vessels. The beds were each 36 inches in diameter and about 48 inches deep. Treated water was removed via line 136.

The water being treated was fed through line 130 to oxidizer 132 and had the following representative composition.

| | |
|---|---|
| Anions | 2.93 mg/L |
| Ca | 20.00 mg/L |
| Cl | 7.60 mg/L |
| Mg | 13.00 mg/L |
| Mn | 79.00 mg/L |
| $NO_3$ | 1.00 mg/L |
| K | 24.00 mg/L |
| Na | 22.00 mg/L |
| As V | 0.012 mg/L |
| As III | 0.011 mg/L |

This water feed was treated with chlorine (0.2 mg/L) (0.2 ppm) to oxidize the AsIII to AsV. Any equivalent oxidizer, such as 0.2 to 5 ppm chlorine or the like, can be used. It should be pointed out that this oxidation is a very conventional step in the industry as it is common to treat water with about 0.5 ppm of chlorine during a conventional water purification scheme. It is not necessary to treat the water twice with chlorine.

The water feed, as treated in the oxidizer, was fed to the ion exchange unit at a rate of 10 gpm/$ft$.

Arsenic levels were reduced to below the analytical detection limit of 0.001 mg/L after 300 bed volumes of water had been fed per bed. This level of performance was observed in samples taken at 3100 bed volumes and out to beyond 7500 bed volumes. At that time, beds were taken out of service sequentially to verify the efficacy of the regeneration steps.

The regeneration sequence described with reference to system 800 depicted in FIG. 8 was used. The regenerant brine was a 7-8% by weight sodium chloride brine. The volumes and flow sequences described with FIG. 8 were used.

The flow directions were:
Absorption—downflow
First stage Regeneration—upflow
Second stage Regeneration—upflow
Rinse—upflow The spent regenerant taken off of the first regeneration stage as effluent to waste via line 138 contained high levels of arsenic. The arsenic in this waste was precipitated by adding $FeCl_3$ solution via line 142 to the effluent. 20 g $FeCl_3$ was added per gram of total arsenic in the waste. The $FeCl_3$ converted to $Fe(OH)_3$ and $Fe(H_2AsO_4)_3$ which precipitated. The product, including the combined precipitate was passed via line 144 to filter 146. The solids were recovered in filter 146 and removed as solid toxic waste via line 148. Spent brine, with its arsenic removed, was discharged via line 150.

This example demonstrates that arsenic can be removed continuously from water flows to levels below the analytical detection limit using the present invention's ion exchange system. The regeneration cycle is at lease 3000 bed volumes, the volume of water treated even at the scale of this example, with 10 to 20 columns in use can range from 1000 to 2000 gpm. The liquid waste effluent can be rendered nontoxic by a simple precipitation process.

The foregoing has described the principles, preferred embodiments and modes of operation of the present invention. However, the invention should not be construed as limited to the particular embodiment discussed. Instead, the above described embodiment should be regarded as illustrative rather than restrictive, and it should be appreciated that variations may be made in those embodiments by worker skilled in the art without departing from the scope of the present invention as defined by the following claims.

What is claimed is:

1. A system for continuously removing nitrate contaminant from nitrate contaminated water comprising:

a plurality of immobile vessels, each containing a resin bed capable of binding nitrate contaminant from said nitrate contaminated water and yielding purified water and a nitrate contaminated resin bed;

a plurality of electronically controlled valves fitted to each one of the immobile vessels, one of said valves admitting contaminated water to the vessel, one removing purified water, one admitting regenerant, one admitting rinse liquid and one or more removing regenerant rinse liquid; and an electrical controller directing the plurality of electrically controlled valves so that when the system is in operation continuously removing nitrate contaminant, nitrate contaminated water is flowed to a subset of vessels, regenerant is flowed to a subset of vessels containing the most highly nitrate contaminated resin bed and rinse liquid is flowed to a subset of containing the least contaminated resin bed.

2. The system of claim 1, wherein the electrical controller is sequenced to allow a predetermined number of vessels to be engaged in purification while the others engage in regeneration while the system is in operation.

3. The system of claim 2, where the plurality is at least ten.

4. The system of claim 2 for continuously removing nitrate contaminant from nitrate contaminated water comprising:

the plurality of immobile vessels, each containing a resin bed capable of binding nitrate contaminant from the nitrate contaminated water and yielding purified water and a nitrate contaminated resin bed, said vessels each having a first fluid communication opening at a first end and a second fluid communication opening at a second end with the resin bed located there between, each vessel having a first header directly adjacent to the first opening and connected to the first opening and a second header directly adjacent to the second opening and connected to the second opening, the first header of each vessel being directly connected through electronically-actuatable valves to a first series of manifolds and the second header of each vessel directly through actuatable valves to a second series of manifolds, the first series of manifolds comprising:

a) at least one of a manifold for supplying nitrate contaminated water and a manifold for removing treated water, b) at least one of a manifold for supplying regenerant solution and a manifold for removing spent regenerant solution, and c) at least one of a manifold for supplying rinse water and a manifold for removing spent rinse water and the second series of manifolds comprising the converse of the manifolds connected to the first headers and the electrical controller directing the actuatable valves a) to flow nitrate contaminated water from a manifold over through the resin beds in a first subset of the plurality of vessels thereby causing these resin beds to remove nitrate contaminant from said nitrate contaminated water and deposit the nitrate contaminant upon the resin beds and yield treated water and to remove said treated water from these vessels to a second manifold, b) to flow regenerant solution from a manifold through at least one resin bed in a second subset of the plurality of vessels to regenerate said at least one resin beds and to remove spent regenerant solution from these vessels and c) to flow rinse water from a manifold through at least one regenerated resin bed in a third subset of the plurality of vessels to rinse said at least one regenerated resin bed and to remove spent rinse water from these vessels.

5. The system of claim 4 wherein the vessels and the resin beds are vertically oriented with the first fluid openings at the top and the second fluid openings at the bottom of the resin beds.

6. The system of claim 5 wherein the resin beds substantially fill the vessels which contain them.

7. The system of claim 6 wherein the resin beds fill least about 90% of the volume of the vessels which contain them.

* * * * *